United States Patent Office 2,882,268
Patented Apr. 14, 1959

2,882,268
METAL COMPLEXES OF AZO DIFORMATE ESTERS

James C. Kauer, Wilmington, Del., assignor to E. I. du Pont de Nemours and Company, Wilmington, Del., a corporation of Delaware No Drawing. Application November 1, 1956
Serial No. 619,694

9 Claims. (Cl. 260—149)

This invention relates to novel metal complexes of organic azo compounds and to the methods of preparing said complexes.

Metal complexes of certain azo compounds are known and have been found to have wide utility as dyes and pigments. However, these azo compounds are generally aromatic in character with the carbons immediately adjacent to the azo nitrogens being annular members of an aromatic nucleus, both mono and polycyclic. As such, the properties and especially the chemical reactivity of the complexes, have been rather limited. Furthermore, these azo compounds are almost exclusively prepared from aromatic compounds with free phenolic or other acid substituents, which obviously do not permit the presence of many other reactive functions. Finally even within such limited fields direct and simple preparation of such complexes with group VIII metals has proven difficult.

It is an object of this invention to produce a new class of metal complexes of organic azo compounds in which the carbons immediately adjacent to the azo nitrogens are not only non-aromatic in character, but also are directly involved in a functional group.

More particularly, this new class of metal azo complexes is of the elements of group VIII of the periodic table, and especially the first three members thereof, i.e., the iron group (iron, cobalt and nickel) with the azodiformate esters, and especially with the azodiformate esters which other than azo nitrogen and ester oxygen are solely hydrocarbon. These complexes have two forms: one in which one molecule of the azodiformate ester is linked to one atom of the group VIII metal which is in turn linked to one molecule of a monovalent carbonyl substituting group, such as hydrogen, halogen, cyanyl and nitrosyl; and the other in which three molecules of the azodiformate ester are linked to two atoms of the iron group metal.

The novel complexes of the invention can be represented by the following structural formula:

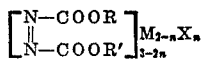

in which R and R', which can be alike or different or joined together, are monovalent organic radicals, generally of no more than about twelve carbons each; X is a monovalent carbonyl substituting group such as hydrogen, halogen, cyanyl, and nitrosyl; M is an element of group VIII of the periodic table and $n$ is a cardinal number no greater than 1, i.e., 0 and 1. A preferred class of these complexes is that formed with alkyl azodiformate esters, i.e., wherein R and R' are alkyl radicals of no more than eight carbons each, and M is an iron group metal, i.e., iron, cobalt, or nickel. Particularly preferred are those complexes as above defined wherein $n$ is zero.

The complexes are formed between an azodiformate ester and a metal carbonyl or a hydride, halide, cyanyl or nitrosyl thereof. The azodiformate esters are those of azodiformic acid with aliphatic, cycloaliphatic, or aromatic hydrocarbon, and the corresponding halo- or nitro- substituted alcohols and phenols in which the ester radicals can be alike or different and preferably contain no more than 12 carbon atoms each.

Suitable specific examples of these azodiformate esters, in addition to those given in the following examples, include the aliphatic azodiformate esters, such as the dimethyl, dipropyl, didodecyl, dioctyl, bis(2-chloroethyl), methyl ethyl, ethyl butyl azodiformates, and the like; the cycloaliphatic azodiformate esters such as dicyclohexyl azodiformate; the aromatic azodiformate esters such as dephenyl, bis(p-chlorophenyl), bis(p-nitrophenyl) diformates and the like.

The ingredient which combines with the ester to form the complex is a group VIII metal carbonyl or substituted metal carbonyl. The iron group metal carbonyl and carbonyl substitution products are preferred. In addition to iron penta-carbonyl, dicobalt octacarbonyl, and nickel tetracarbonyl the higher carbonyls of the same metals, e.g., diiron nonacarbonyl, triiron dodecacarbonyl, and tetracobalt dodecacarbonyl can be used. Typical carbonyl substitution products which can be used are iron tricarbonyl dibromide, cobalt tricarbonyl cyanyl, cobalt tetracarbonyl hydride, iron tetracarbonyl dichloride and the like.

While the reaction proceeds satisfactorily in the absence of any diluent medium, it is sometimes desirable to have an inert diluent present to obtain a product of a different particle size. The general range is from 0.1 to 10.0 microns in the case of finely divided powders up to large lumpy solids in the case of agglomerates. Suitable inert, liquid, organic diluents which could be used for this purpose include those well known in the art, such as: the halogenated aliphatic and aromatic hydrocarbons, e.g., carbon terachloride, hexachloroethane, chlorobenzene, and the like; the aliphatic, aromatic, or cycloaliphatic hydrocarbons, e.g., the pentanes, the hexanes, the heptanes, benzene, toluene, the xylenes, cyclohexane, and the like; and the oxygen-containing diluents such as the ethers, ketones and esters, e.g., diethyl ether, dibutyl ether, acetone, dipropyl ketone, cyclohexanone, ethyl acetate, butyl acetate, methyl benzoate, and the like.

The reaction can be effected at temperatures ranging from 0° to about 100° C. with temperatures ranging from room temperature to about 50° C. being the most convenient. Reaction times will vary from a few hours to a few days depending on the reaction temperature and the reactivity of the starting ingredients. Generally speaking reaction will be complete with the more reactive materials at the higher temperatures in a few hours. Reaction time will increase to a few days with the less reactive materials at the lower temperatures. Practical reaction conditions will generally be at room temperature for from 3 hours to about 24 hours. Reaction times and temperatures are this interrelated variables as is well known to those skilled in the art.

The materials can be reacted in all proportions. The resulting product is more finely divided and the solvent where used, is held more tenaciously as the molar ratio of azodiformate ester to metal carbonyl increases. Yields are best when stoichiometric proportions are used.

The following examples in which the parts are by weight are submitted to illustrate the invention further and not to limit it.

Example 1

To a solution of 17.4 parts of diethyl azodiformate in about 40 parts of cyclohexane was added slowly with stirring 19.6 parts (an equimolar portion based on the formate) of iron pentacarbonyl. A blue-black precipitate formed with gas evolution. The reaction mixture was stirred over a period of 20 hours during which time gas evolution slowly ceased. The solid product was removed by filtration, washed with cyclohexane and petroleum ether, and dried under nitrogen. There was thus obtained 20 parts (about 95% of theory) of diiron tris-(diethyl azodiformate) as a dark blue solid having a particle size of about 1-3 microns in diameter. Infrared analysis showed the presence of no carbonyl group of the type found in a metal carbonyl.

*Analysis.*—Calculated for $C_{18}H_{30}N_6Fe_2O_{12}$: C, 34.2%; H, 4.8%; N, 13.3%; Fe, 17.6%. Found: C, 35.8%, 36.0%; H, 5.5%, 5.6%; N, 12.4%, 12.7%; Fe, 16.4%.

Upon reaction with dilute hydrochloric acid, this compound was converted to ferric chloride and diethyl hydrazodiformate, indicating that the addition product was a complex and neither a salt nor the product of a cleavage of the azo compound.

Substantially the same results were obtained under identical conditions in which benzene, carbon tetrachloride, or diethyl ether were used in place of the cyclohexane. The particle size of the products ranged from 1-3 microns. The same results were also obtained in the absence of any solvent whatever. Substitution of acetone for the cyclohexane solvent led to substantially the same results except that diiron tris(diethyl azodiformate) complex was obtained in fairly uniform round particles of 0.1-0.2 micron diameter.

*Example 2*

To a solution of 5.48 parts of nickel carbonyl in about 37.5 parts of cyclohexane was added slowly with stirring 11.0 parts (about two molar proportions based on the carbonyl) of diethyl azodiformate. A thick black precipitate formed at once, accompanied by rapid gas evolution. About 150 parts of n-hexane was added to facilitate stirring. The solid product was removed by filtration, washed with petroleum ether, and dried under vacuum at 80° C. There was thus obtained dinickel tris(diethyl azodiformate) as a black crystalline solid.

*Analysis.*—Calculated for $C_{18}H_{30}N_6O_{12}Ni_2$: C, 33.8%; H, 4.7%; N, 13.1%; Ni, 18.4%. Found: C, 33.7%; H, 5.0%; N, 12.1%, 12.3%; Ni, 19.9%, 20.2%.

Upon decomposition of this compound by pyrolysis at about 500° C. there was obtained a dark powder containing magnetic nickel particles.

*Example 3*

To a solution of 2.26 parts of dicobalt octacarbonyl in about 200 parts of anhydrous diethyl ether was added slowly with stirring ten parts (4.35 molar proportions on a cobalt atom basis) of diethyl azodiformate. A black precipitate formed slowly with gas evolution. The reaction mixture was stirred for three days and the solid product removed by filtration, washed with petroleum ether, and dried under nitrogen.

There was thus obtained before drying for analysis 4.72 parts of dicobalt tris(diethyl azodiformate) as a black amorphous powder.

*Analysis.*—Calculated for $C_{18}H_{30}N_6O_{12}Co_2$: C, 33.8%; H, 4.7%; N, 13.1%; Co, 18.4%. Found: C, 34.1%, 34.3%; H, 5.2%, 5.3%; N, 12.4%, 12.7%; Co, 19.3%, 19.6%.

*Example 4*

A diethyl ether solution of iron carbonyl iodide was prepared by careful, portion-wise addition of a solution of 4.7 parts of iodine in about 70 parts of diethyl ether to a solution of 7.2 parts (a substantially equimolar portion based on the iodine) of iron pentacarbonyl in about 140 parts of anhydrous diethyl ether. To the resulting solution of iron carbonyl monoiodide was added slowly with stirring 6.45 parts (an equimolar proportion based on the iodide) of diethyl azodiformate. A black precipitate formed and gas was evolved slowly over a period of two days. The solid product was removed by filtration, washed with benzene, and vacuum dried. There was thus obtained 9.0 parts (69% of theory) of iron iodide (diethyl azodiformate) as a black amorphous powder.

*Analysis.*—Calculated for $C_6H_{10}N_2O_4FeI$: C, 20.2%; H, 2.8%; N, 7.9%; Fe, 15.6%; I, 35.3%. Found: C, 21.8%; H, 3.5%; N, 7.7%, 7.9%; Fe, 17.0%, 17.5%; I, 33.9%.

Upon reaction with water, this compound was converted to iodine, to ferric hydroxide, and diethyl hydrazodiformate, indicating that the addition product was a complex and not a salt and also that there was no change in the basic structure of the azo compound.

*Example 5*

To a solution of 15.0 parts of di-2-ethylhexyl azodiformate in about 85 parts of anhydrous benzene was added 14.6 parts of iron pentacarbonyl slowly with stirring. A dark blue precipitate formed slowly with gas evolution. The reaction mixture was stirred for three days and the solid product then removed by filtration and washed with ether. After drying, there was obtained 5.0 parts (30% of theory) of diiron tris(di-2-ethylhexyl azodiformate) as a dark blue amorphous powder.

*Analysis.*—Calculated for $C_{54}H_{10}N_6O_{12}Fe_2$: C, 57.1%; H, 9.1%; N, 7.4%; Fe, 9.8%. Found: C, 56.7%; H, 9.2%; N, 7.1%, 7.2%; Fe, 10.4%.

As illustrated specifically by the foregoing examples, the present invention is generic to organometallic complexes containing one to two atoms of a metal of group VIII bonded, respectively, to one and three molecules of an azodiformate ester, any remaining valences of the metal component being satisfied by a monovalent group capable of replacing a carbonyl, i.e., CO, moiety in a metal carbonyl structure, e.g., hydrogen, halogen, cyanyl, or nitrosyl. Because of readier availability of the necessary intermediates and ease of preparation therefrom, the preferred oganometallic complexes are those wherein the metal component, which in the case of the higher complexes can be alike or different, is in the first triad of group VIII and the azodiformate ester component, which in the higher complexes can also be alike or different, is an aliphatically saturated (i.e., free of non-aromatic unsaturation) hydrocarbon ester of no more than 12 carbons in each such ester group, and especially the saturated aliphatic hydrocarbon esters of no more than eight carbons in each such ester group. Because one less reactant is required the most preferred complexes of the present invention are those where the metal and the azodiformate ester components are as above and three azodiformate ester moieties are linked to two such metal atoms.

In the manner set forth in the examples, using these additional specific examples of the reactants, other group VIII metal azodiformate complexes of the present invention can be prepared. Thus, from dimethyl azodiformate and diiron nonacarbonyl there is obtained diiron tris(dimethyl azodiformate); from dipropyl azodiformate and triiron dodecacarbonyl there is obtained diiron tris(dipropyl azodiformate); from dioctyl azodiformate and tetracobalt dodecacarbonyl there is obtained dicobalt tris(dioctyl azodiformate); from methyl ethyl azodiformate and iron tricarbonyl dibromide, there is obtained iron bromide(ethyl methyl azodiformate); from butyl ethyl azodiformate and cobalt carbonyl cyanyl, there is obtained cobalt cyanyl(butyl ethyl azodiformate); from didodecyl azodiformate and cobalt carbonyl nitrosyl, there is obtained cobalt nitrosyl(didodecyl azodiformate); from dicyclohexyl azodiformate and cobalt carbonyl hydride, there is obtained cobalt hydride(dicyclohexyl azodiformate); from diphenyl azodiformate and iron carbonyl chloride, there is obtained iron chloride(diphenyl azodiformate).

These new group VIII metal/azodiformate ester adducts are useful in several ways. For instance, they are useful as chemical intermediates in the preparation of otherwise difficultly accessible organic compounds. More specifically, the complexes by direct interaction with acyl halides can be converted to the known diacyl bicarbamate diesters. To illustrate specifically, to a suspension of 17 parts of diiron tris(ethyl azodiformate) in about 35 parts of benzene was added 13.3 parts of acetyl chloride. Sufficient heat was evolved to boil the benzene. At the end of the reaction the mixture was washed three times with 150 parts of water. The organic layer was separated and purified by fractionation. There was thus obtained seven parts (33% of theory) of diethyl N,N'-diacetyl bicarbamate, melting at 29–30° C. and boiling at 96° C./0.4 mm.

*Analysis.*—Calculated for $C_{10}H_{16}N_2O_6$: C, 46.1%; H, 6.2%; N, 10.9%; M.W., 260. Found: C, 46.4%; H, 6.2%; N, 11.6%, 11.8%; M.W., 250, 255.

The complexes are also useful as sources for the preparation of catalysts and highly active, generally magnetic, finely divided, metal powders, that is, of the corresponding metal. More specifically by pyrolysis, the group VIII metal/azodiformate ester complexes are decomposed to give pyrophoric, catalytically active decomposition products. As the temperature and time of pyrolysis both increase, the amount of organic material remaining in the powder product decreases. Generally, pyrolysis occurs at 250–350° C. in less than an hour. The pyrolyzed product has a metal concentration three times that of the unpyrolyzed material with substantially all the original combined nitrogen. As the pyrolysis temperature is increased, very little change occurs until a certain critical temperature at which nitrogen is lost rapidly and substantially completely in a few minutes. This temperature varies with the complex but is generally in the range of 450–550° C. The remaining carbon-containing portion remains about the same as that obtained at the lower temperatures.

Thus, a sample (32.5 parts) of diiron tris(diethyl azodiformate) of Example 1 was heated under nitrogen to 320° C. Gas evolution was rapid and after a few minutes there remained as a residue 8.0 parts of a fine, black powder.

*Analysis.*—Found: C, 19.3%; H, 1.9%; N, 19.9%, 20.0%; Fe, 51.1%, 51.6%.

In contrast to the initial complex, the pyrolysis product did not react with water. Continued heating of the complex to 380 and 450° C. resulted in slight additional loss of organic matter. The product at 380° C.:

*Analysis.*—Found: C, 16.1%; H, 0.8%; N, 18.8%; Fe, 52.9%.

The product at 450° C.:

*Analysis.*—Found: C, 16.1%; H, 0.7%; N, 18.0%, 18.2%; Fe, 55.3%.

Continued heating of the product to 580° C. resulted in further decomposition with the evolution of nitrogen. There was thus obtained a black, pyrophoric, highly magnetic powder.

*Analysis.*—Found: C, 17.1%; H, 0.5%; N, 1.9%, 2.0%; Fe, 75.0%.

The low temperature pyrolysis products are useful as catalysts, especially in synthesis reactions wherein carbon monoxide is a reactant. The pyrolysis products high in combined metal, e.g., greater than 55% and preferably greater than 70% metal, are useful as permanent magnet materials with a desirably low eddy loss, particularly where there are strong A.C. demagnetizing currents, for instance, as a magnet for focusing cathode rays. The powdered products are easily pressed to the desired forms of the magnetic material; which are useful as magnetic memory cores for computers, microwave attenuators, electrically operated high frequency switches, and the like. The magnetic materials have high saturation/induction ratios and are useful for low loss transformer cores for megacycle/sec. frequency ranges. The powders have high coercivity, generally over 600 oersteds, and high remanance ratios, generally around 0.40.

I claim:

1. A metal complex of the formula

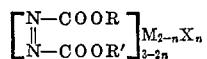

wherein R and R' which can be alike, are selected from the group consisting of aliphatic, cycloaliphatic, and aromatic hydrocarbon radicals of the benzene series and the corresponding halo- and nitro-substituted derivatives thereof; X is selected from the group consisting of hydrogen, halogen, cyanyl and nitrosyl; M is an iron group metal selected from the group consisting of iron, cobalt, and nickel; and $n$ is a cardinal number less than 2.

2. A metal complex of the formula of claim 1 wherein R and R' are alike and are alkyl radicals of less than 9 carbon atoms each.

3. A metal complex of the formula

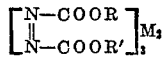

wherein R and R' which can be alike, are selected from the group consisting of aliphatic, cycloaliphatic, and aromatic hydrocarbon radicals of the benzene series and the corresponding halo- and nitro-substituted derivatives thereof; M is a group VIII metal from the group consisting of iron, cobalt and nickel.

4. A metal complex of the formula of claim 3 wherein R and R' are alike and are alkyl radicals of less than 9 carbon atoms each.

5. A metal complex of the formula

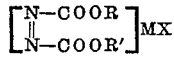

wherein R and R' which can be alike, are selected from the group consisting of aliphatic, cycloaliphatic, and aromatic hydrocarbon radicals of the benzene series and the corresponding halo- and nitro-substituted derivatives thereof; M is selected from the group consisting of iron, cobalt and nickel and X is selected from the group consisting of hydrogen, halogen, cyanyl and nitrosyl.

6. A method for preparing a metal complex which comprises reacting an ester of azodiformic acid selected from the group consisting of the aliphatic hydrocarbon esters, the cycloaliphatic hydrocarbon esters, the aromatic hydrocarbon esters of the benzene series, and the corresponding halo- and nitro-substituted hydrocarbon esters of azodiformic acid with a compound selected from the group consisting of iron, cobalt and nickel carbonyls and the hydrides, halides, cyanyls and nitrosyls thereof.

7. A method for preparing a metal complex which comprises reacting a compound selected from the group consisting of iron, cobalt and nickel carbonyls, and the hydrides, halides, cyanyls and nitrosyls thereof with a dialkyl azodiformate wherein each alkyl group contains less than 9 carbon atoms.

8. A method for preparing a metal complex which comprises reacting a metal carbonyl selected from the group consisting of iron, cobalt and nickel carbonyls with an ester of azodiformic acid selected from the group consisting of the aliphatic hydrocarbon esters, the cycloaliphatic hydrocarbon esters, the aromatic hydrocarbon esters of the benzene series and the corresponding halo- and nitro-substituted hydrocarbon esters of azodiformic acid.

9. A method for preparing a metal complex which comprises reacting a compound of the class consisting of iron, cobalt and nickel carbonyls with a dialkyl azodiformate wherein each alkyl group contains less than 9 carbon atoms.

References Cited in the file of this patent

Strolle et al.: Chem. Abst., vol. 24: 94 (1930).